(12) United States Patent
Babb

(10) Patent No.: US 7,972,402 B2
(45) Date of Patent: Jul. 5, 2011

(54) REINFORCED FILTER ELEMENT

(75) Inventor: Kevin Brian Babb, Vicksburg, MI (US)

(73) Assignee: Mann + Hummel GmbH, Ludwigsburg (DE)

( * ) Notice: Subject to any disclaimer, the term of this patent is extended or adjusted under 35 U.S.C. 154(b) by 259 days.

(21) Appl. No.: 12/175,077

(22) Filed: Jul. 17, 2008

(65) Prior Publication Data

US 2010/0011725 A1 Jan. 21, 2010

(51) Int. Cl.
*B01D 46/00* (2006.01)
(52) U.S. Cl. ............... 55/499; 55/497; 55/498; 55/501; 55/520; 55/521; 210/494.1; 210/497.1
(58) Field of Classification Search .................. 55/498, 55/500, 521, 497, 499, 501, 520; 210/487, 210/494.4, 497.01, 497.1
See application file for complete search history.

(56) References Cited

U.S. PATENT DOCUMENTS

| 6,102,978 | A * | 8/2000 | Butler ........................... 55/492 |
| 6,176,890 | B1 | 1/2001 | Svedlind et al. |
| 6,517,598 | B2 | 2/2003 | Anderson et al. |
| 6,524,479 | B2 | 2/2003 | Schwinghammer |
| 7,396,375 | B2 * | 7/2008 | Nepsund et al. ................ 55/481 |
| 7,481,863 | B2 * | 1/2009 | Oelpke et al. .................... 55/521 |
| 2006/0123754 | A1 * | 6/2006 | Oelpke et al. .................... 55/498 |
| 2007/0169449 | A1 * | 7/2007 | Merritt ............................ 55/486 |
| 2007/0271886 | A1 | 11/2007 | Rieger et al. |
| 2009/0320423 | A1 * | 12/2009 | Merritt et al. ................... 55/498 |
| 2009/0320424 | A1 * | 12/2009 | Merritt et al. ................... 55/502 |

FOREIGN PATENT DOCUMENTS

WO WO2007/087233 A2 8/2007
WO WO 2007087233 A2 * 8/2007

* cited by examiner

*Primary Examiner* — Robert A Clemente
(74) *Attorney, Agent, or Firm* — James Hasselbeck

(57) ABSTRACT

The present invention provides one or more reinforcing members configured to act together with the adhesive bonding between filter media layers to further resist axial deformation forces such as induced by fluid flowing through the filter and thereby acting to retain the structural form and integrity of the filter element. Also disclosed is a method of reinforcing layers of a multilayer axial filter element against displacement of the layers.

14 Claims, 10 Drawing Sheets

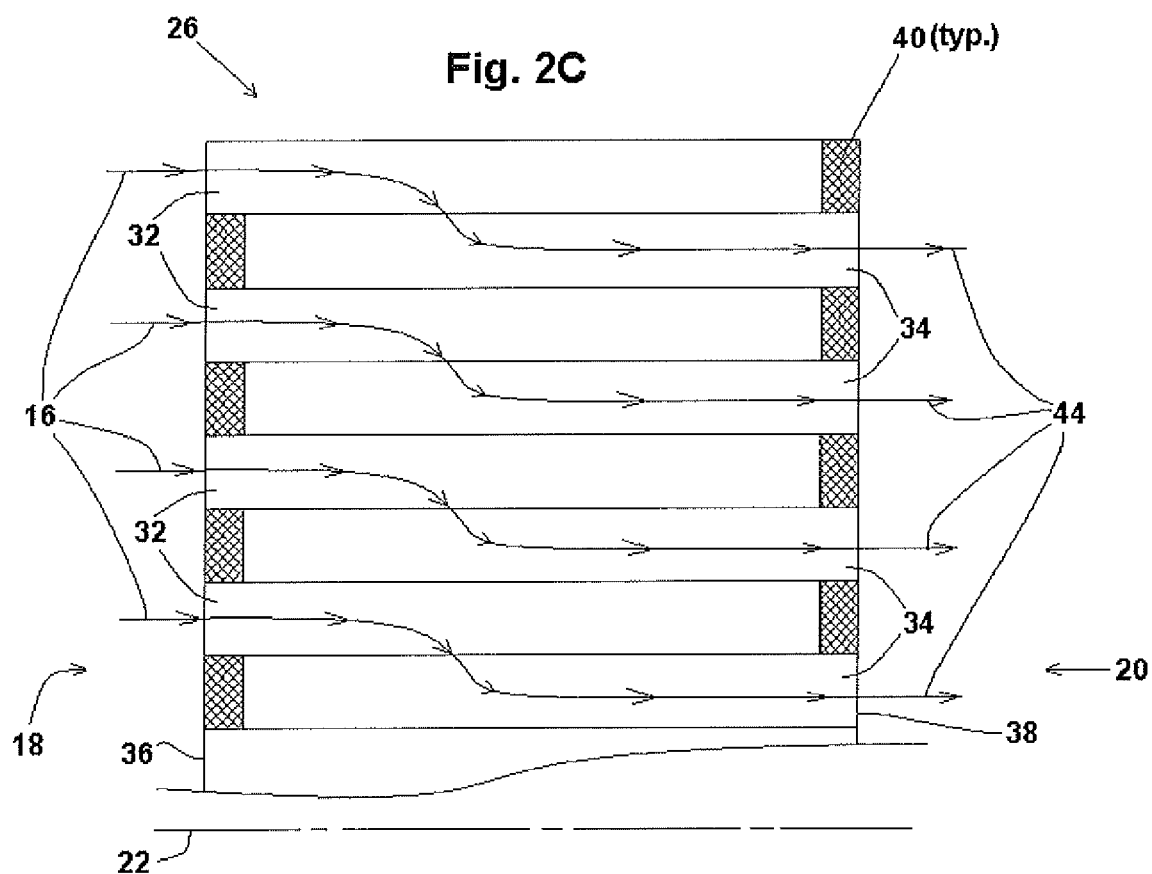

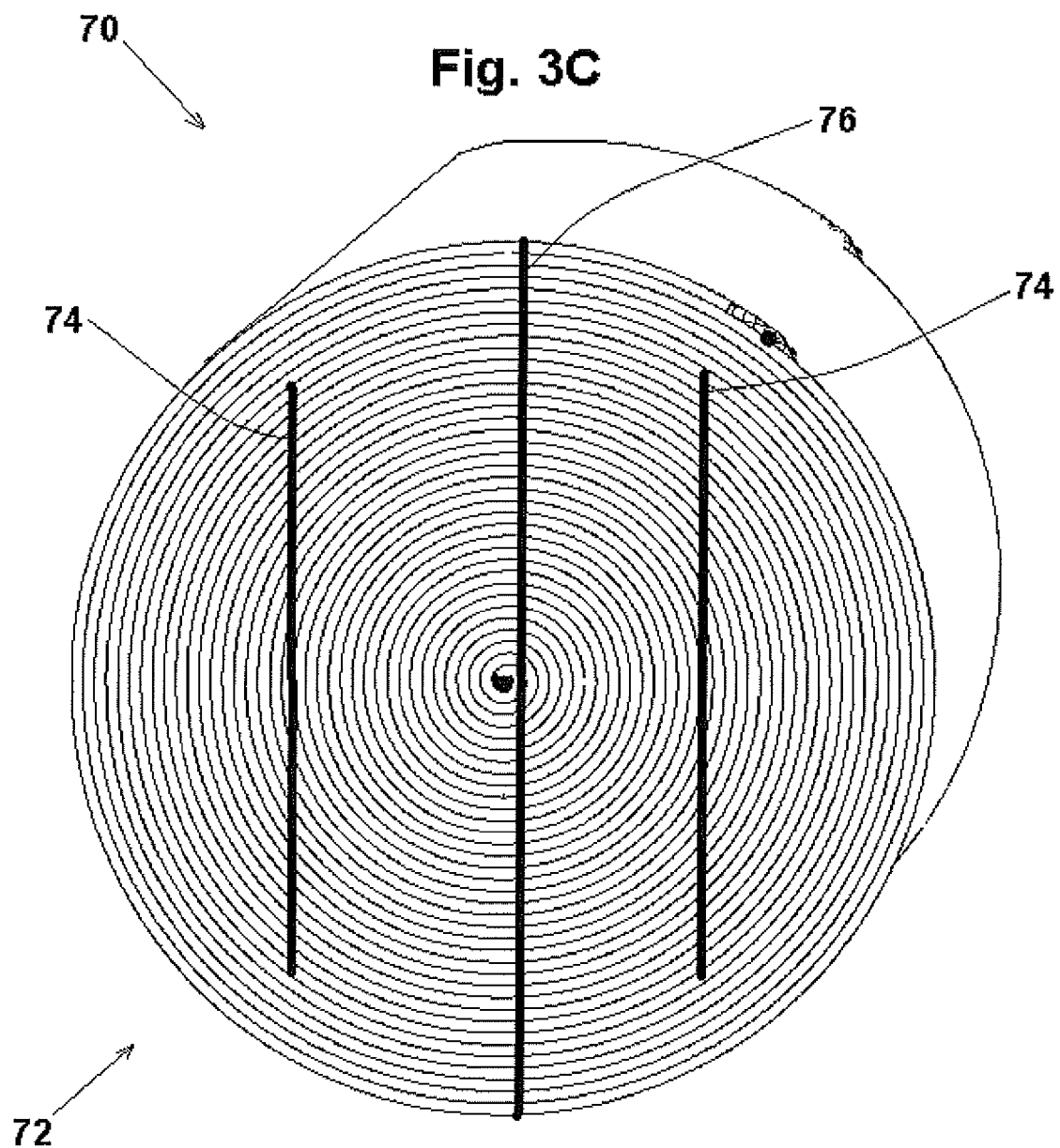

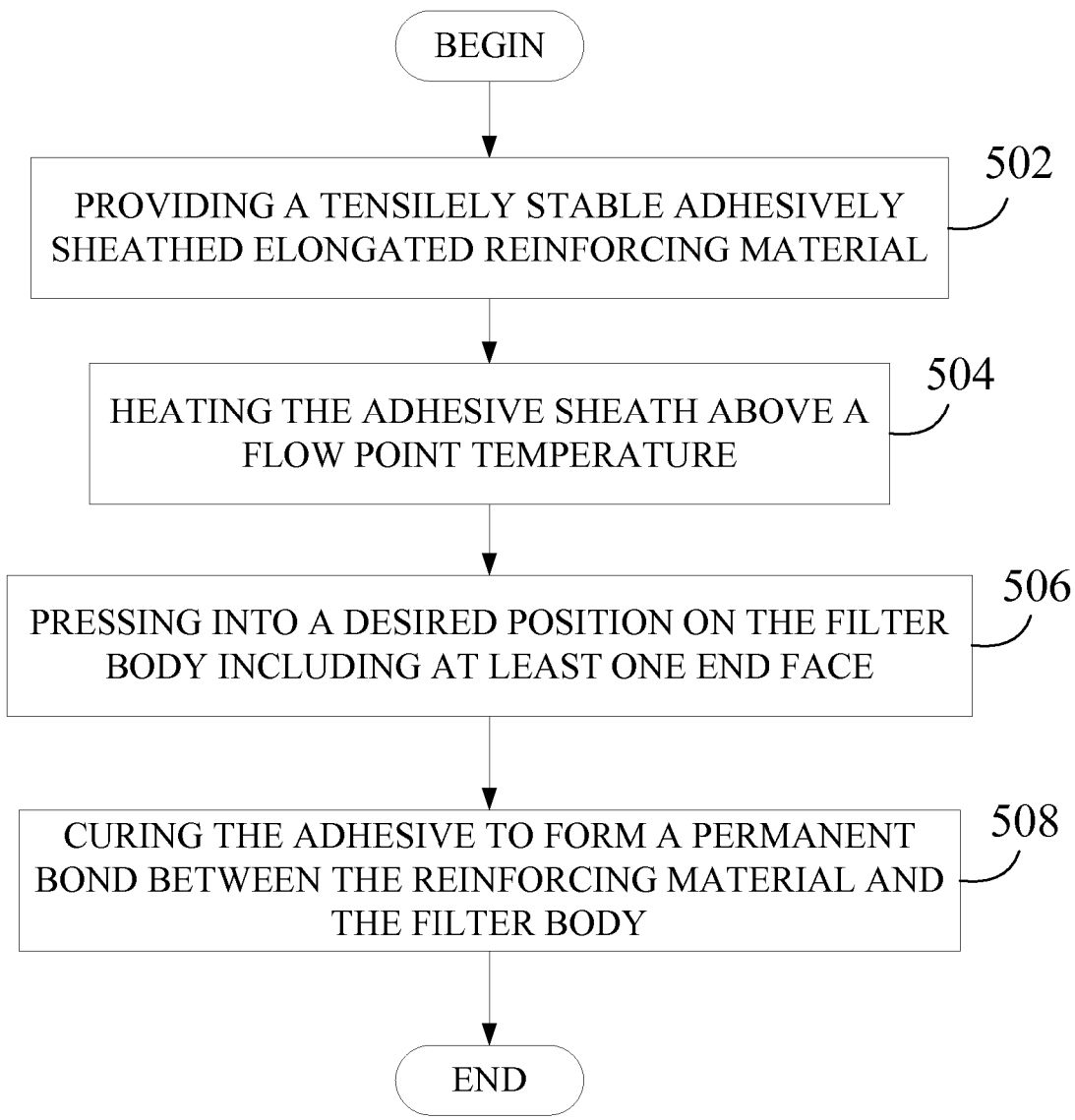

REINFORCED FILTER ELEMENT

TECHNICAL FIELD

The present invention relates to fluid filter elements and, more particularly to apparatus and methods to structurally reinforce such filter elements against stresses induced into the filter element due to fluid flow.

BACKGROUND OF THE INVENTION

Fluid filter elements, including filters for liquids and gases, are in widespread use. One particular class of fluid filter element is the axial flow filter. The axial flow filter element is typically formed by wrapping or coiling a pleated sheet of filter media to form a multilayer filter body. In axial flow filters the fluid stream enters the filter element at one end face of the filter, is processed through the filter media and then exits the filter element at an axially opposing end face of the filter.

As an example of an axial flow filter, U.S. Published Patent application 2007/0271886 (Rieger et. al) discloses an axial flow filter element having at least one flat filtering element wrapped or coiled into a compact body configured to filter fluid media flowing generally axially between two end faces of the filter element. The filter element is formed of at least one layer of corrugated or pleated filter paper and a layer of smooth un-corrugated filter paper. The layers are bonded together and then tightly wrapped together to form an axial flow filter element of the desired shape and size.

Filters experience fluid flow induced stress on the filter media layers during operation. The flow induced stress may be severe in certain cases, for example, when the flow rate is very high, when the filter is perhaps substantially fouled with debris. In the case of an axial flow air filter in service during abnormal operating conditions in which the filter element becomes wetted with water, the flow induced stress may become severe. The formation of elevated axial stresses in filter elements due to abnormal operating conditions may result in the potentially compromise the structural or adhesive bonds between the wrapped layers of the filter element. In rare cases where the bonds are severely compromised this may lead to telescopic deformation of the filter medium or other deformations of the filer element.

Time-consuming and expensive manufacturing and engineering solutions have been employed to resolve this problem, including the addition of a plastic grid support structure on the clean side of the filter element, as well as various formulations of adhesives between filter element layers, filter housings incorporating filter element support structures and the like. While such techniques are useful in overcoming the problem, they are less than optimal from a filter cost and filter component complexity standpoint and therefore the need exists for a cost effective solution.

SUMMARY OF THE INVENTION

The present invention provides an improved filter element having one or more reinforcing members configured to act together with the adhesive bonding between filter media layers so as to strengthen the filter and act to further resist axial deformation forces such as induced by fluid flow through the filter, thereby acting to retain the structural form and integrity of the filter element. The disclosed invention may be advantageously used with many different design types of filter elements. One non-limiting example application is in providing reinforcement to axial flow filter elements intended for service as engine combustion air filters, for example on certain trucking, heavy equipment and automotive vehicle applications. Axial flow filter elements are typically manufactured by wrapping or coiling at least one flat filtering element about an axis to form a compact filter body. An adhesive is applied to portions of the flat filter element to adhesively bind the layer together to form a structurally stable filter body. In such axial flow filter elements the fluid stream flows through the filter body between two opposing filter end faces.

According to one aspect of the invention, the filter has at least one flat filter media element wrapped relative to an axis to form a multilayer filter body. The filter has a first end face and an opposing second end face formed at opposing margins of the filter body. At least one reinforcing member is provided and secured to at least a portion of the filter layer margins extending across at least a portion of one end face. The reinforcing member providing a tensilely stable reinforcement to supportively retain a relative positional relationship between at least a portion of the layers of the multilayer filter element. For use in comprehending the teachings of this disclosure, we define "tensilely stable" to mean the reinforcing member does not elongate or stretch significantly when subject to tensile forces within the ranges expected during operation of the filter.

According to another aspect of the invention, the flat media material has at least one support layer of filter material and at least one layer of corrugated filter material. The corrugations provide channels in the filter material. The layers are adhesively secured to each other to form the flat media element.

According to another aspect of the invention, the filter material includes any of: filter paper, spun-bond synthetics, or melt blown synthetics.

According to yet another aspect of the invention, the reinforcing member includes a filamentary core having a thermoplastic pre-coated hot melt sheath. The hot melt sheath is operable to adhesively secure the reinforcing member to the filter element.

According to a further aspect of the invention, the filamentary core includes metallic wire or multi-stranded metallic wire.

According to another aspect of the invention, the filamentary core includes string having one or more filaments.

According to another aspect of the invention, the reinforcing member includes a core having a flattened cross section, the core further having a thermoplastic pre-coated hot melt sheath, the hot melt sheath operable to adhesively secure the reinforcing member to the filter element. In certain aspects of the invention the core may include any of: a metallic strip, a woven wire strip, a woven fabric strip, and/or a woven fiberglass strip.

According to further aspects of the invention, at least one reinforcing member wraps and adhesively secures onto the first end face, onto the second end face and onto the outer surface of the filter body.

In another aspect of the invention, the filter element also includes at least one filter edge protector adhesively secured over the outside surface and onto portions of the at least one wrapping reinforcing member. At least one edge protector is adhesively secured onto a portion of the outside surface of the filter body.

Also disclosed is a method of reinforcing an axial filter body having a plurality of filter layers and two opposing end faces against axial displacement of the layers.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 2C illustrates a schematic plan view of the flat media element of FIG. 2A depicting fluid flow through alternately sealed channels in the filter media provided by corrugations of the corrugated layer of the filter media element;

FIG. 3C illustrates an end face view of an axial flow filter incorporating an alternate arrangement of reinforcing members consistent with the present invention;

FIG. 5 depicts a flow chart describing a method of reinforcing a filter body having a plurality of layers and two opposing end faces consistent with the present invention.

DESCRIPTION OF THE PREFERRED EMBODIMENTS

Figure 1:
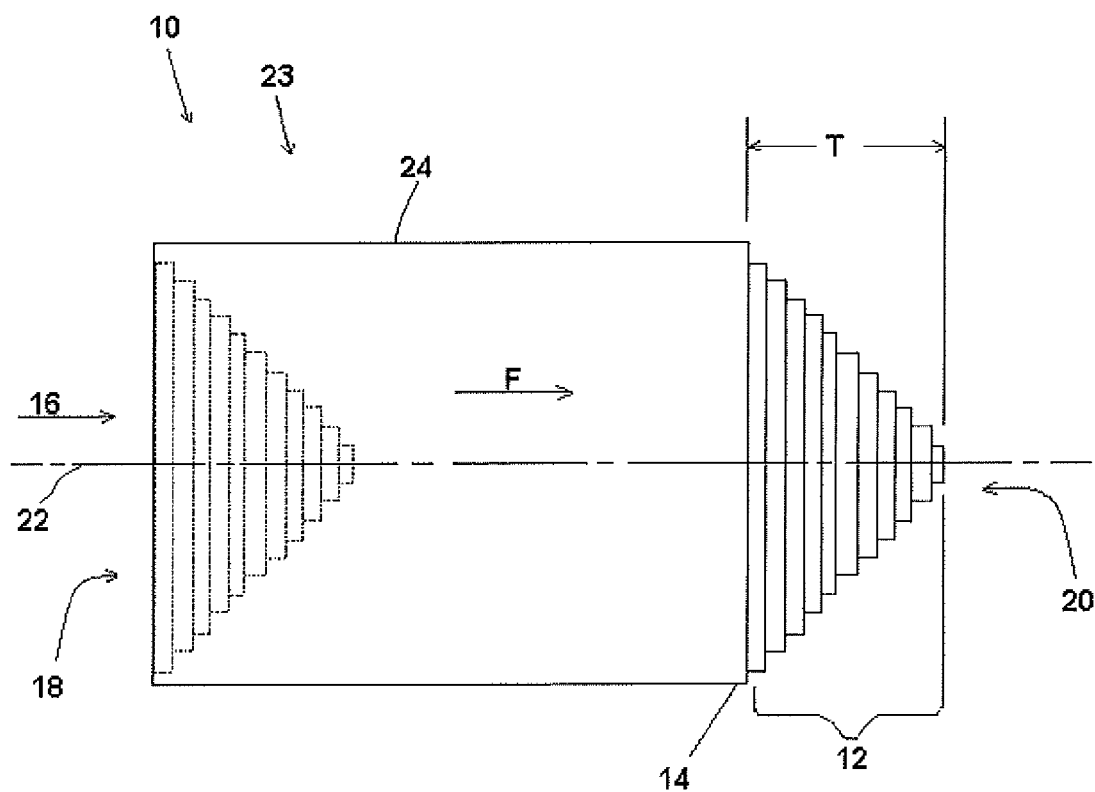
FIG. 1 illustrates a schematic side view of an axial flow filter depicting a interlayer bonding failure mode that may result from elevated axial stress.

Fluid filters of various types are known in the art. Filters typically utilize a filtration media having a filter mesh size small enough to entrain and remove undesired matter such as particulate solids from the fluid stream. The teachings of this inventive disclosure may be applied to reinforce any of a wide variety of fluid filter types against filter media deformation due to, among other things, elevated stresses induced due to certain fluid flow conditions. One illustrative example application discussed and presented herein is in reinforcing axial flow filters such as those applied in combustion air filtering for motor vehicle engines.

Axial flow filter elements typically have corrugations or pleats forming a plurality of axially aligned dead-end channels, each having one end closed or sealed and the opposing end open through one of the end faces of the filter element. The open end of the channel is in communication with the fluid flow. A first portion of the channels are open to a first end face of the filter and the remaining channels are open to the opposing end face of the filter. The closed ends of the channels prevent direct flow of fluid stream between the end faces of the filter element, thereby constraining the fluid stream to flow through the walls of the channels in the filtering media into adjacent channels. Channels are arranged such that the adjacent channels open to alternating faces of the filter element.

A fluid stream, for example a gaseous stream such as a flowing stream of air, initially enters the filter element at a first end face and into one or more dead-end channels, then migrates through the walls dividing adjacent channels in the filter media layer (example: filter paper) subsequently exiting the filter element through an adjacent dead-end channel opening onto an opposing end face of the filter element. An advantage of axial flow filters is that they offer a larger filter surface area for a given size of filter element when compared to a conventional pleated filter, resulting in more compact filter for a given required filter surface area.

Due in part to the fine mesh of the filter element, filter elements induce a restriction to the fluid flow through the filter resulting in a pressure drop across the filter. For a given filter element the pressure drop across the filter is effected by the properties of the filtered fluid as well as the flow rate of the fluid stream through the filter. The level of contamination of the filter element is another factor influencing the pressure drop across the filter (as accumulated contamination or dirt in the filter acts to obstruct a portion of the pores in the mesh of the filter media). Increasing the flow rate and/or increasing contamination in the filter element act to increase the pressure drop across the filter. The filter pressure drop imposes a substantially axially aligned stress on the wrapped or coiled layers of the filter media. As axial filters are generally supported in the filter housing at the outer surface, the axial stress induced by increasing pressure drop acts so as to attempt to extend or telescope the inner coiled layers of the filter element relative to the outer layers of the filter element. This telescopic extension is typically prevented by adhesives provided between the layers of the filter serving to structurally bind the layers together. If the adhesive strength or adhesive bond strength is not sufficient to counteract this force, the result can lead to an undesired deformation in the filter element and may contribute to eventual structural failure of the element.

Filter elements are designed to have structural properties adequate to resist the effects of filter pressure drop expected in the normal operating life of the filter. However, in certain unexpected and abnormal operating conditions any particular filter element might be exposed to unexpected extreme axial stresses that can lead to telescoping of the inner coiled layers of the filter. One illustrative example of such abnormal filter operating condition is a water logged air filter in an automotive engine application. The air induction system in an automotive application is typically designed to prevent the undesired admittance of water into the engine air induction system. Water is not compressible and having any quantity of water entering the engine is highly undesirable. A failure of the automotive air induction system or vehicle operation in unexpected adverse conditions might result in a water logged air filter element due to water droplets reaching and possibly saturating the air filter element. Water accumulation within the air filter element results in further obstruction of the air flow through the filter element leading to substantial increases in the pressure drop and the elevated resultant axial force (stress) within the filter element. Such high axial stresses may lead to a deformation or failure of the filter as discussed earlier.

For better understanding of the present invention, the discussion now turns to a description of the illustrations in the provided Figures.

FIG. 1 illustrates a schematic side view representation of an axial flow filter element 10 depicting an interlayer bonding failure mode that may result from elevated axial stress. The filter body 23 is formed from a flat filter media layer that has been coiled or wrapped about an axis 22 and having a periphery filter outer surface 24. The filter element 10 includes the filter body 23 plus, in some embodiments, additional components such as edge protectors (not show in FIG. 1 but discussed later with FIG. 4).

In the present disclosure, references herein to the filter element are to be understood to encompass the filter body plus any additional components (if any) that may be attached to the filter body to form a complete filter element.

In the embodiment illustrated in FIG. 1, the filter body 23 and filter element 10 are one in the same. Layer 14 is the outer layer of the filter body 23. Layers 12 are inner layers (relative to the outer layer 14). The individual layers (outer layer 14 and the inner layers 12) are adhesively bonded to one another during manufacture of the filter body 23 to form a functional axial flow filter 10. For illustration and discussion purposes, FIG. 1 illustrates a potential result of a failure mode which (in the illustrated example) produces a telescopic extension T of at least some of the filter inner layers 12 relative to the outer layer 14 due to the elevated stress induced by fluid stream 16 flowing through filter 10. In operation, fluid stream 16 enters the filter 10 at the first end face 18 (also know as the dirty side of the filter) and exits the filter 10 at the opposing second end face 20 (also known as the clean side of the filter). In an axial flow type of filter the fluid stream 16 is generally directionally aligned with axis 22 of the filter. The flow of the fluid stream 16 through the filter 10 produce a reaction stress or force F acting upon the plurality of filter media layers of the filter element 10. If the magnitude of the reaction stress F is sufficient, then a portion of the adhesive bonds (not shown) securing the layers (12,14) together to form a structurally stable filter element 10 may be compromised resulting in an adhesive or a bonding failure between two or more adjacent layers. An adhesive or bonding failure may permit filter 10 to axially telescope (as illustrated by telescopic distance T) or otherwise deform. The telescopic deformation T of filter element 10 may result in the functional failure of filter 10 in that a portion of the fluid stream 16 may pass between any of the filtration layers (12, 14) of filter 10 and then exit the end face 20 of the filter 10 without receiving the intended benefit of filtration by the filtration layers (12, 14). In other words, the fluid stream leaving the filter element 10 may contain contaminants intended to be removed by the filter 10.

It is therefore desirable to provide an innovative mechanism on the filter element 10 to reinforce the filter element 10 and thereby prevent telescopic deformation T under conditions of elevated axial stress.

Figure 2A:
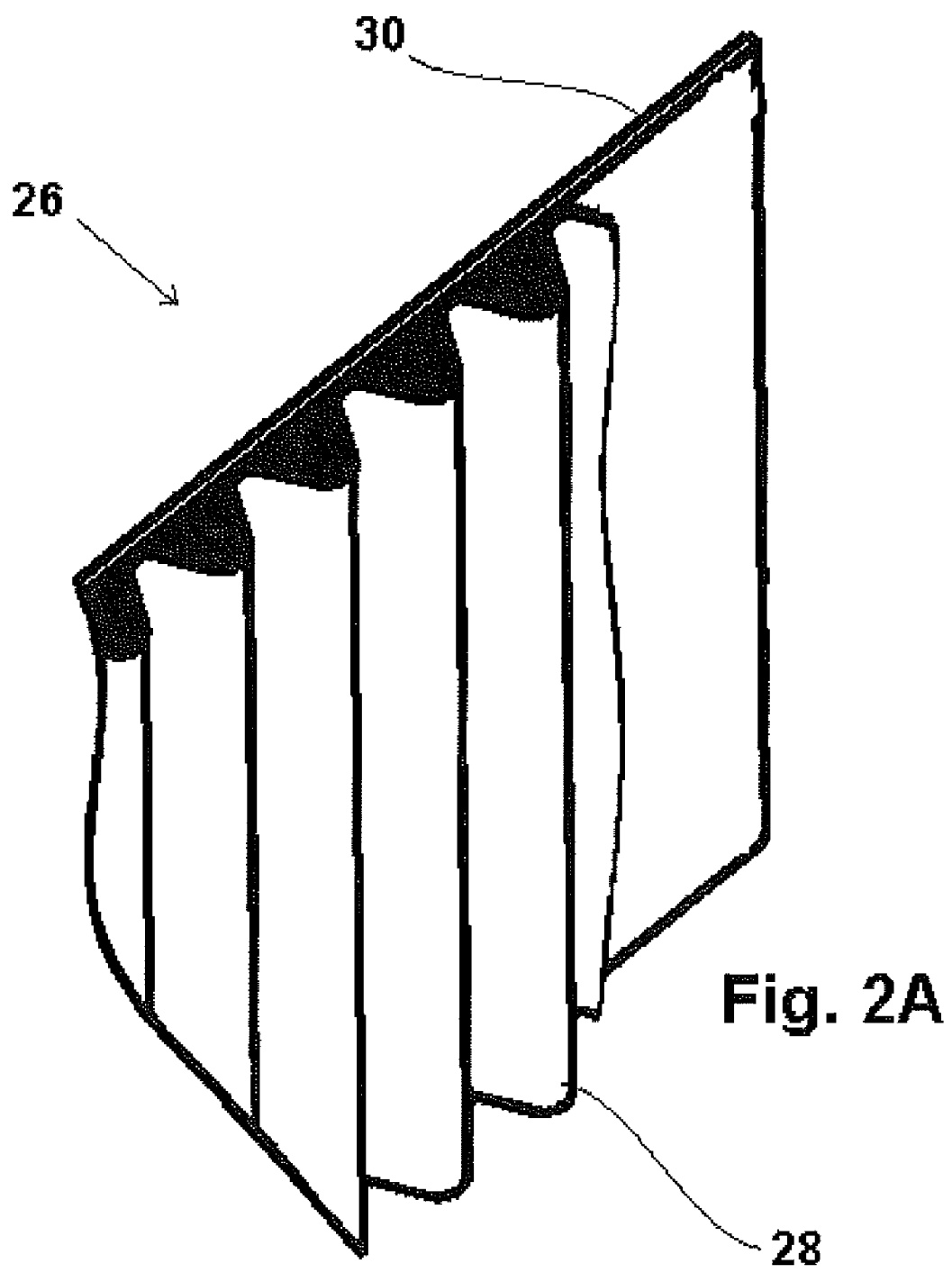
FIG. 2A illustrates a side perspective view of a flat filter media element having a corrugated layer bonded to a support layer.

FIG. 2A illustrates a perspective view of filter media margins corresponding to end face portions of a flat media element 26 having a corrugated or pleated layer 28 of filter material bonded to a support layer 30 of filter material. In some embodiments the filter material of layers 28 and/or 30 may include synthetics and multi layer filter media. These synthetics may be non-woven and could be, but not limited to, spun-bond or melt blown construction. Multi layer filter media may incorporate a synthetic layer with a cellulose layer.

Figure 2B:
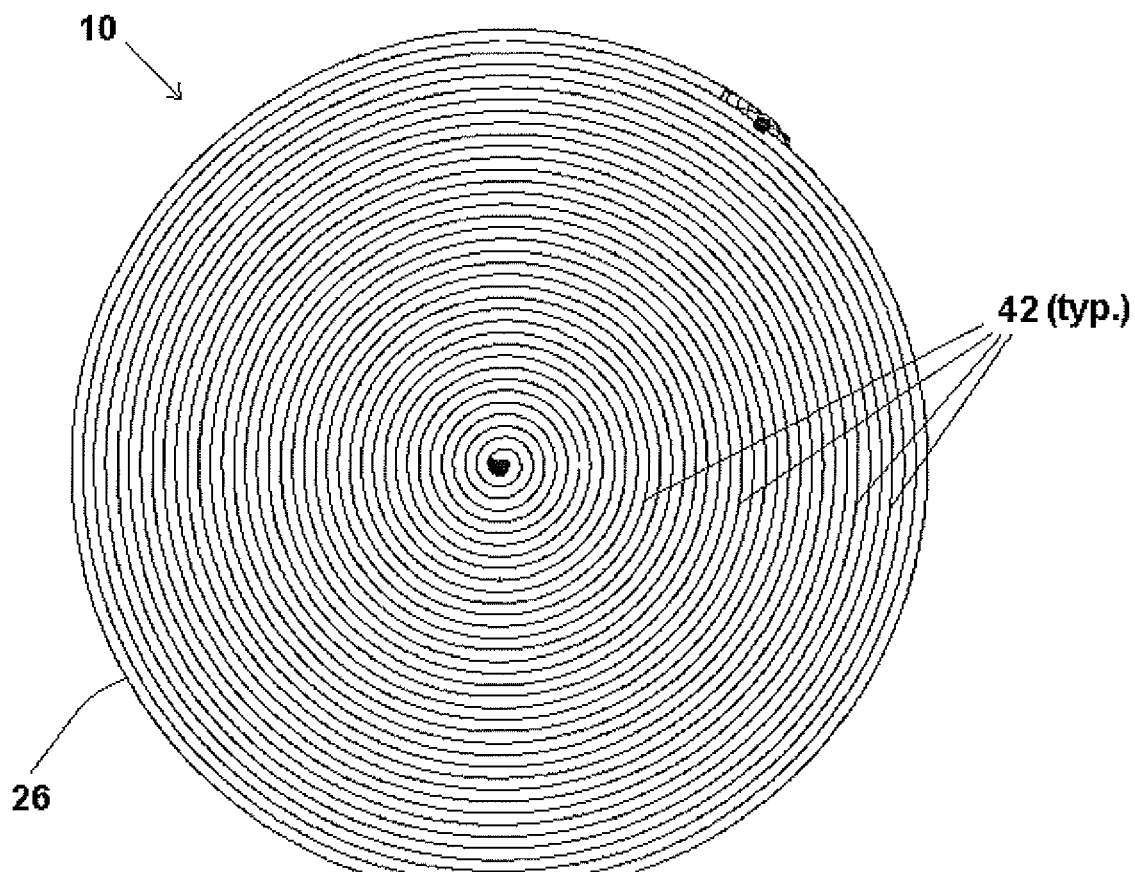
FIG. 2B illustrates a schematic end face view of an axial flow filter element formed by coiling or wrapping the flat media element of FIG. 2A so as to form multiple filter media layers.

FIG. 2B illustrates a schematic end face view of the axial flow filter element 10 formed by coiling or wrapping the flat media element 26 of FIG. 2A to form multiple filter media layers 42 in the filter element 10.

FIG. 2C illustrates a schematic plan view of the flat media element 26 of FIG. 2A depicting fluid flow through the alternately sealed channels (32, 34) formed by corrugations (also called pleats) of the corrugated layer 28 (see FIG. 2A). The corrugations, when coiled as shown in FIG. 2B, form a series of channels (32, 34) through the axial flow filter element 10. The channels (32, 34) are generally aligned with axis 22 (corresponding to the axis about which the flat filter media 26 (see FIGS. 2A and 2B) are coiled to form the filter element 10). Channels 32 are dead-end channels open only at margins corresponding to the first end face 18 (see FIG. 1) and in fluid communication with the dirty side of the filter. Channels 34 are dead-end channels open only at margins corresponding to the second end face 20 (see FIG. 1) and in fluid communication with the clean side of the filter. The fluid stream 16 enters the filter element 10 through the channels 32 at the first end face 18 (see FIG. 1), then migrates through the walls formed by the corrugated layer 28 and/or the support layer 30 (see FIG. 2A), flowing into an adjacent channel 34 opening at the second end face 20, subsequently exiting the filter 10 as fluid stream 44.

As depicted and discussed earlier with FIG. 1, fluid stream 16 acts to induce stress F (see FIG. 1) which may tend to break adhesive bonds between filter media layers 42 (see FIG. 2B) resulting in a telescopic extension T (see FIG. 1), possibly resulting in filter integrity failure of the axial filter element 10 (see FIG. 1).

Figure 3A:
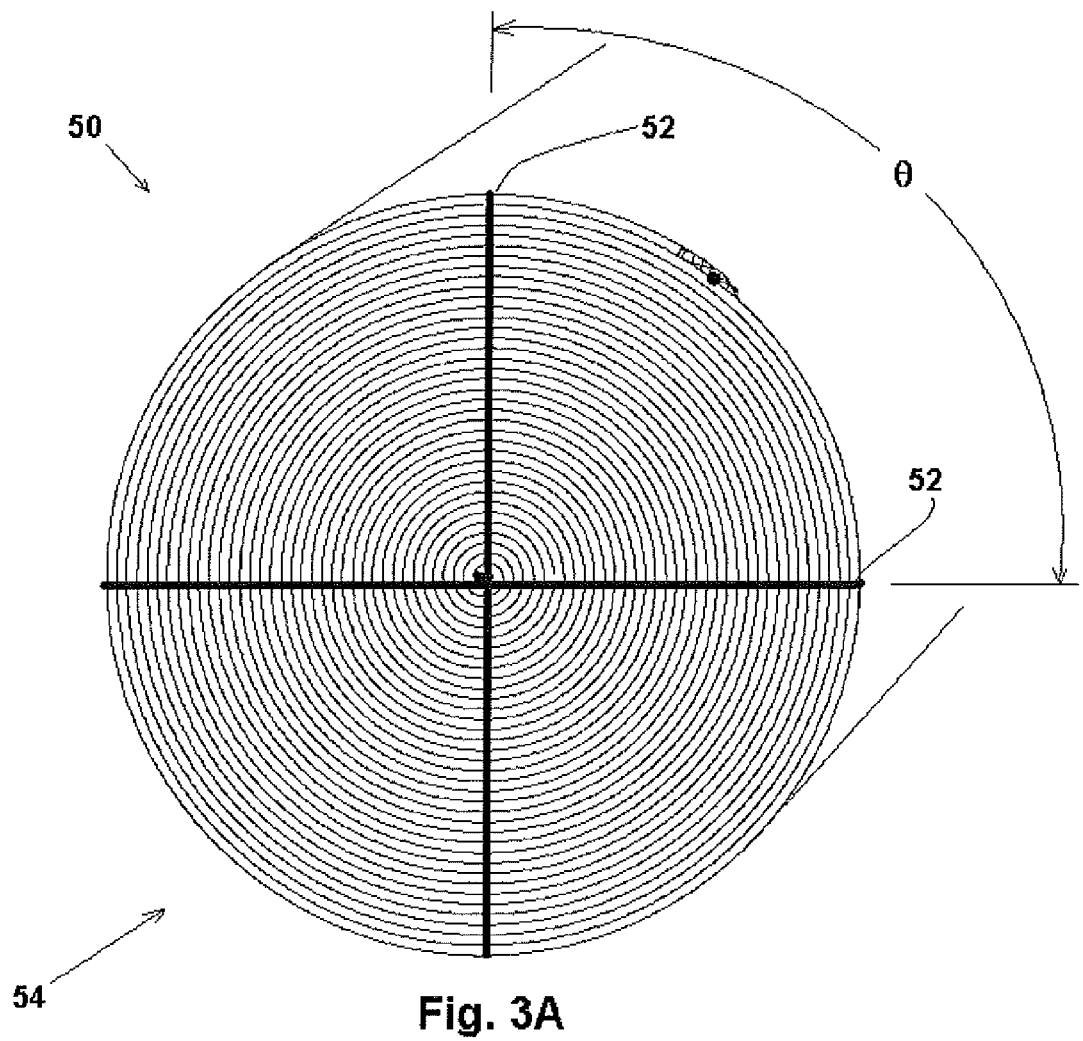
FIG. 3A illustrates a schematic end face view of a flow filter element incorporating reinforcing members consistent with the present invention.

FIG. 3A illustrates a schematic end face view of a filter element 50 incorporating reinforcing members 52 consistent with the present invention. Filter element 50 may be an axial flow filter as illustrated and discussed earlier or alternately any of a variety of filter elements as would be known to those skilled in the art. In FIG. 3A, two reinforcing members 52 are secured to the end face 54 of the filter element 50, specifically onto the filter layer margins (36 or 38 see FIG. 2C) and operable to reinforce the inner filter layers 12 (see FIG. 1) against telescopic deformation relative to the outer filter layer 14 (see FIG. 1). End face 50 is to be understood to represent any of the first end face 18 (see FIG. 1) on the filter dirty side and/or the second end face 20 (see FIG. 1) on the filter clean side. Individual reinforcing members 52 are secured to either the first end face 18 (see FIG. 1), the second end face 20 (see FIG. 1) or to both end faces. The angle θ (Theta) between reinforcing members is to be understood to be any angle greater than zero degrees and less than or equal to ninety degrees.

Reinforcing members 52 are operable to supportively retain the relative positional relationship between layers (12, 14 see FIG. 1) of said multilayer filter element 10 even if the adhesive bonds structurally bonding adjacent layers together should fail. Reinforcing members 52 are preferably lengths of adhesively sheathed reinforcing material such as adhesively coated string or adhesively coated wire. It is desirable that cores of the reinforcing members 52 utilize a tensilely stable material. The adhesive used in the sheath may be any curable adhesive material that is suitable to adhesively bond to portions of the filter element to which it comes into contact. Various suitable curable adhesives are known to those skilled in the art. Preferably the adhesive sheath material is a hardened thermoplastic adhesive also known as a hot melt adhesive. Hot melt adhesives are utilized by first heating the adhesive to an adhesive flow point so as to soften the adhesive. The reinforcing material with the heated adhesive may then be pressed onto a desired position on the filter body. Once applied to the filter body the hot melt adhesive quickly cools below the flow point with the result that the adhesive hardens and adhesively binds the restraint material to the filter body, forming the restraint member as discussed earlier. Hot melt adhesives are well known to those skilled in the art.

Figure 3B:
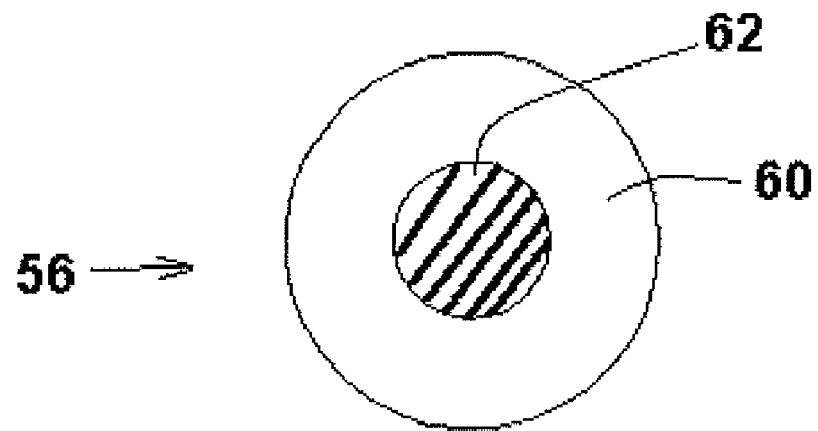
FIG. 3B illustrates cross sectional views of two reinforcing members.
Figure 3B:
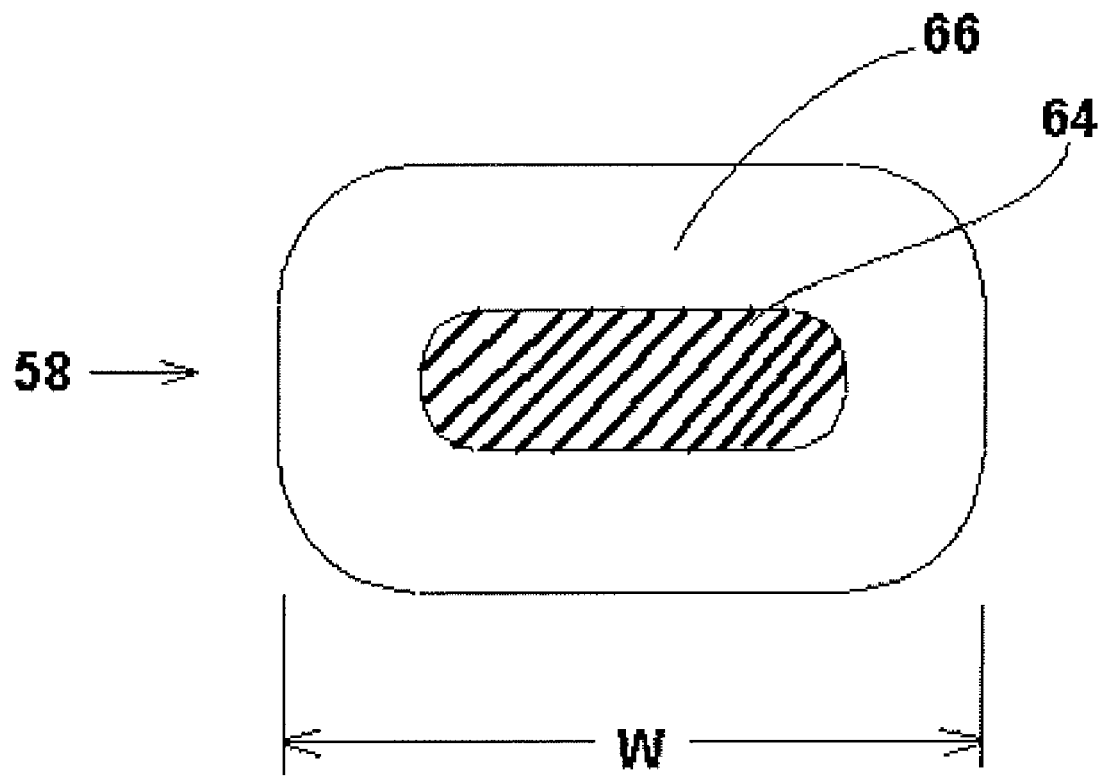

For use in comprehending the teachings of this disclosure, we define "tensilely stable" to mean the reinforcing member does not elongate or stretch significantly when subject to tensile forces within the ranges expected during operation of the filter. Examples of such materials include filamentary materials such as a metallic wire core, a fiberglass core and various types of fiber strings among others. The cross section of the reinforcing member may be of any variety of forms. FIG. 3B illustrates a cross section view of an example reinforcing member 56 having a circular cross sectional shape in which a substantially round and tensilely stable reinforcing member 62 is sheathed by an adhesive layer 60.

FIG. 3B illustrates a traverse cross sectional view of a reinforcing member 56 having a circular cross section. The reinforcing member 56 has a core 62 of tensilely stable reinforcing material sheathed by an adhesive sheath utilizing hot melt or other adhesive material as discussed earlier above. Although the core 62 is illustrated as coaxial with the sheath 62, this is for drafting convenience only and is not to be interpreted in a limiting way. The center of the core 62 may be offset from the center of sheath 60 as long the core 62 remains contained within the circular cross section of sheath 60.

FIG. 3B also illustrates a traverse cross sectional view of a reinforcing member 58 having a flattened cross section. The reinforcing member 58 has a flattened core 64 of tensilely stable reinforcing material sheathed by an adhesive sheath 66 utilizing hot melt or other adhesive material as discussed earlier above. The reinforcing core 64 may include any of: a metallic strip, a woven wire strip, a woven fabric strip such as woven fiberglass or polyesters, as well as a strip formed of certain plastics having suitable characteristics in which the plastics are tensilely stable within the expected operating tensile stresses and temperatures of the filter element. When utilizing reinforcing elements having a flattened cross section such as reinforcing element 58, it is preferable that the width W of the reinforcing member 58 be minimized. An unnecessarily wide reinforcing member may obstruct or block a portion of the fluid channels in the filter element, thereby reducing filter area and increasing filter pressure drop. As discussed earlier with reinforcing member 56, the core 64 is illustrated as coaxial with the sheath 66 but this is for drafting convenience only and is not to be interpreted in a limiting way. The center of the core 64 may be offset from the center of sheath 66 as long as the core 64 remains contained within the periphery limits the sheath 66.

FIG. 3C illustrates a schematic end face 72 view of an axial flow filter 70 incorporating an alternate arrangement of reinforcing members (74, 76) consistent with the present invention. As discussed earlier, filter element 70 may be an axial flow filter as illustrated or alternately any of a variety of filter elements as would be known to those skilled in the art. In FIG. 3C two of the reinforcing members 74 are illustrated as having a similar length and are positioned to straddle a longer reinforcing member 76. Reinforcing members 74 and 76 are positioned in a spaced parallel relationship on either or both end faces of the filter element. Illustrated end face 72 is representative of either the first end face 18 (see FIG. 1) or the second end face 20 (see FIG. 1) of the filter element 70. The reinforcing members (74, 76) are adhesively secured to one or more of the filter layer margins (36, 38 see FIG. 2C) and are operable to reinforce the inner filter layers 12 (see FIG. 1) against telescopic deformation (see FIG. 1).

Figure 3D:
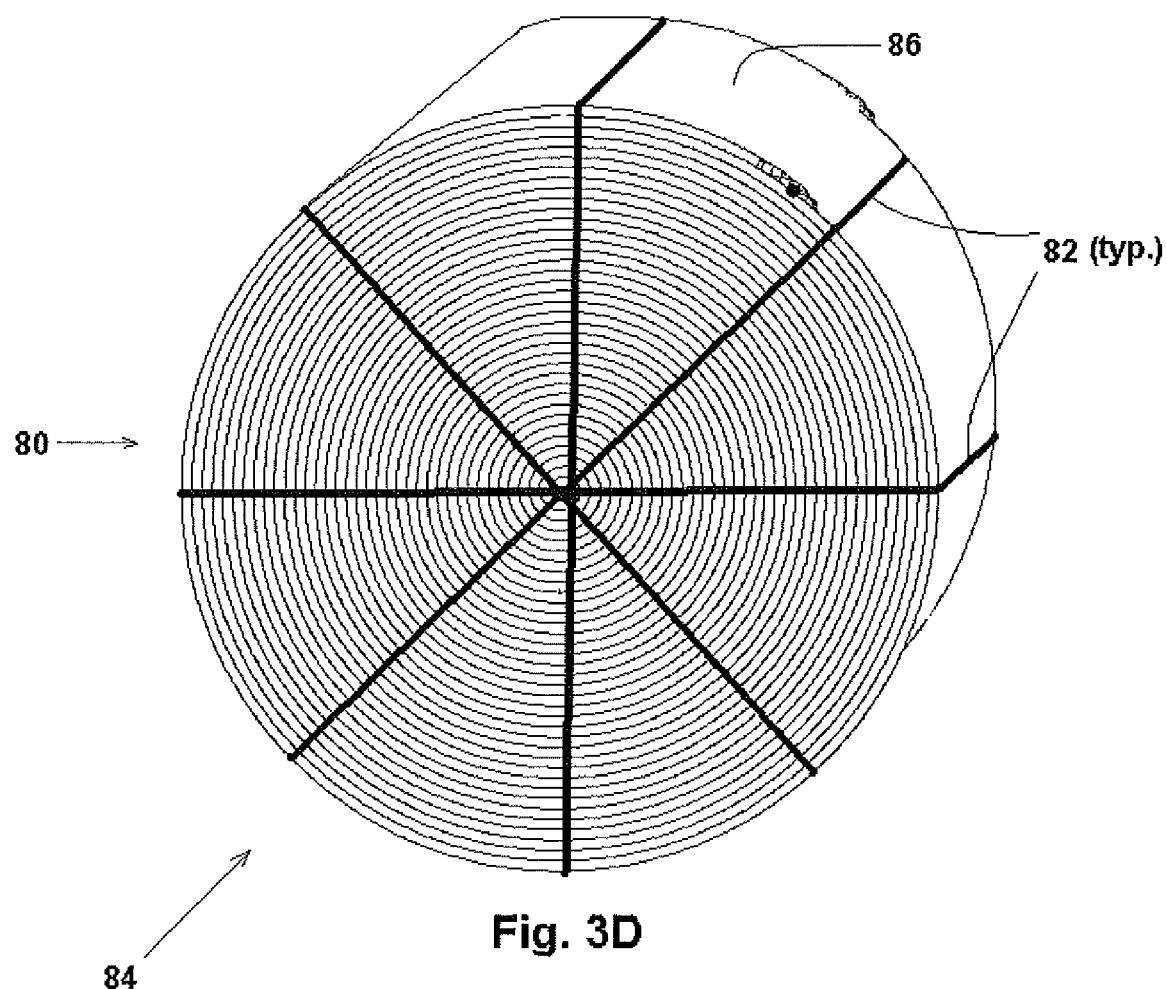
FIG. 3D illustrates an end face view of an axial flow filter incorporating another example of an arrangement of reinforcing member in which reinforcing members wrap both end faces and the filter outside surface consistent with the present invention.

FIG. 3D illustrates a schematic end face view of an axial flow filter 80 incorporating another arrangement of reinforcing members 82 consistent with the present invention. Although similarities are present when compared to FIG. 3A, FIG. 3D is provided to further illustrate that any number and arrangement of reinforcing members 82 may be provided to reinforce the filter 80 against telescopic deformation. In FIG. 3D reinforcing members 82 wrap over and are adhesively secured to both end faces 84 (only one end face 84 is visible in this view, other opposing end face has a similar arrangement) by extending the reinforcing members 82 over and adhesively securing the reinforcing members to the filter outside surface 86 as well as the end faces 84, consistent with the presented invention. Wrapping the reinforcing members 82 around the filter 80 as illustrated in FIG. 3D increases the total surface area of the adhesive bond between the filter 80 and the reinforcing members 22, thereby providing a more robust bond that is better able to resist fluid flow stresses tending to telescopically deform the filter layers 12 (see FIG. 1).

Figure 4:
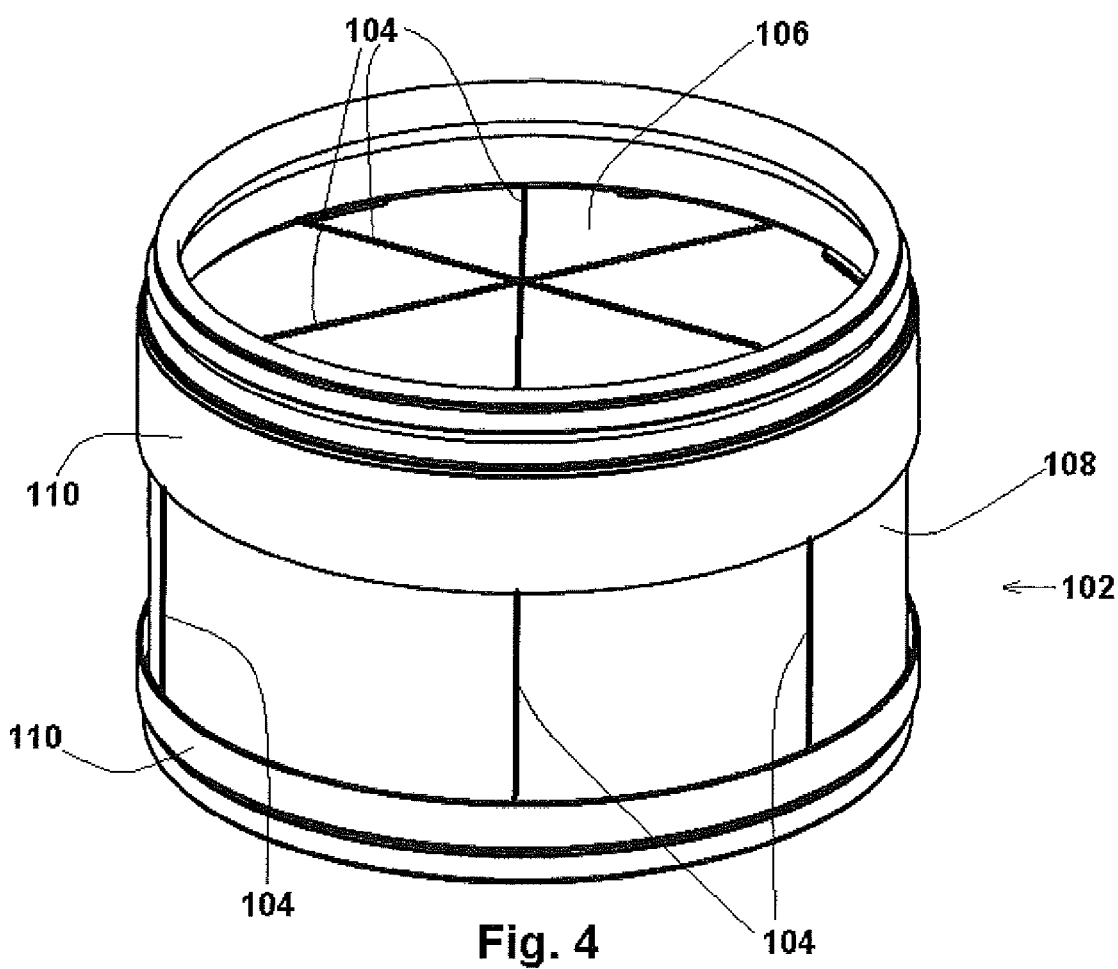
FIG. 4 illustrates a perspective view of an axial filtering element having edge protector rings together with reinforcing members wrapping both end faces and the filter outside surface consistent with the present invention.

FIG. 4 illustrates a perspective view of an axial filtering element 102 incorporating reinforcing members 104 further secured to the outside surface 108 of a filter element 102 by plastic rings 110 that are adhesively secured over and onto portions of the reinforcing members 104 and onto a portion of the outer surface 108 of the filter element 102. Advantageously, the plastic rings 110 may also serve as edge protectors which on some filter elements protect the filter end faces 106 (and 18, 20 see FIG. 1) against accidental damage during storage, shipping, handling and installation of the filter element 102. In FIG. 4 the restraining members 104 are also adhesively bonded to the end faces (106, only one of the two end faces is visible in this view) as well as to the filter element outer surface 108.

Also disclosed is a method 500 of reinforcing an axial filter body having a plurality of filter layers and two opposing end faces against axial displacement of the filter layers. The method is illustrated in the flow diagram of FIG. 5. The method begins at step 502 by providing a tensilely stable reinforcing material having an elongated filamentary core and an adhesive outer sheath (also referred to herein as an adhesive coating). It is preferred that the adhesive sheath be a hardened thermoplastic adhesive (also known as hot melt). The method continues at step 504 by heating the adhesive sheath above a flow point temperature at which point the adhesive softens and becomes "tacky". Then at step 506 the reinforcing material is pressed into a desired position on the filter body. When the adhesive material is pressed into the desired position, the adhesive sheath of the reinforcing material contacts and adhesively binds to at least a portion of at least one of the filter body end faces. The reinforcing material may optionally also contact portions of the outside surface of the filter, and may further continue in a generally axial direction across the outside surface of the filter to contact and adhesively bind to portions of the opposing face of the filter body. The procedure continues at step 508 by curing the adhesive to form a permanent adhesive bond between the reinforcing material and portions of the filter body traversed by the reinforcing material. When the adhesive is a hot melt adhesive, the curing step is practiced by allowing the adhesive to cool below the flow point temperature of the hot melt adhesive. The "cured" reinforcing material is now structurally and supportively bonded to the filter body and forms the reinforcing member discussed earlier with various Figures.

While the best modes for carrying out the invention have been described in detail, those familiar with the art to which this invention relates will recognize various alternative designs and embodiments for practicing the invention within the scope of the appended claims.

The invention claimed is:
1. A filter element for filtering a fluid stream comprising:
   at least one flat filter media element wrapped relative to an axis to form a multilayer filter body having an outside surface;

a first end face and an opposing second end face, said end faces formed at opposing margins of said filter layers of said filter body; and at least one reinforcing member secured to at least a portion of said filter layer margins and extending across at least a portion of at least one of said end faces, said reinforcing member providing a tensilely stabile reinforcement to supportively retain a relative positional relationship between at least a portion of the layers of said multilayer filter element;

wherein said filter element is adapted for said fluid stream to enter said filter element at said first end face and exit said filter element at said second end face;

wherein at least one of said at least one reinforcing member wraps and adhesively secures onto said first end face, onto said second end face and onto an outer surface of said filter body.

2. A filter element for filtering a fluid stream comprising:

at least one flat filter media element wrapped relative to an axis to form a multilayer filter body having an outside surface;

a first end face and an opposing second end face, said end faces formed at opposing margins of said filter layers of said filter body; and at least one reinforcing member secured to at least a portion of said filter layer margins and extending across at least a portion of at least one of said end faces, said reinforcing member providing a tensilely stabile reinforcement to supportively retain a relative positional relationship between at least a portion of the layers of said multilayer filter element;

wherein said filter element is adapted for said fluid stream to enter said filter element at said first end face and exit said filter element at said second end face;

wherein said at least one reinforcing member is adhesively secured to at least one of said end faces and secured to at least a portion of said outside surface, said filter element further comprising:

at least one filter edge protector adhesively secured over said outside surface and onto portions of said at least one reinforcing member, said at least one edge protector adhesively secured onto a portion of said outside surface of the filter body.

3. The filter element of claim 2, wherein said flat filter media element comprises:

at least one support layer of filter material; and at least one layer of corrugated filter material, said corrugations forming channels, wherein said at least one support layer and said at least one corrugated layer are adhesively secured to each other to form said flat filter media element.

4. The filter element of claim 3, wherein said filter media element comprises any of filter paper, spun-bond synthetics, or melt blown synthetics.

5. The filter element of claim 4, wherein said fluid stream is a gaseous stream and wherein said filter element is an axial flow filter element.

6. The filter element of claim 2, wherein said reinforcing member comprises a filamentary core having thermoplastic pre-coated hot melt sheath, said hot melt sheath operable to adhesively secure said reinforcing member to said filter element.

7. The filter element of claim 6, wherein said filamentary core comprises metallic wire or multi-stranded metallic wire.

8. The filter element of claim 6, wherein said filamentary core comprises string having one or more filaments.

9. The filter element of claim 2, wherein said reinforcing member comprises a core having a flattened cross section, said core further having a thermoplastic pre-coated hot melt sheath, said hot melt sheath operable to adhesively secure said reinforcing member to said filter element.

10. The filter element of claim 9, wherein said core comprises any of: a metallic strip, a woven wire strip, a woven fabric strip, and a woven fiberglass strip.

11. The filter element of claim 2, wherein said at least one reinforcing member is a plurality of reinforcing members with at least two of said reinforcing members secured to at least one of said end faces in a cross pattern.

12. The filter element of claim 2, wherein said at least one reinforcing member is a plurality of reinforcing members with a portion of said plurality of reinforcing members secured to at least one of said end faces in a spaced parallel relationship.

13. A method of reinforcing the filter element of claim 2, the filter element including an axial filter body having a plurality of filter layers and two opposing end faces against axial displacement of said filter layers comprising:

providing a tensilely stabile reinforcing material having an elongated filamentary core and an adhesive outer sheath;

pressing said reinforcing material into a desired position onto said filter body, said desired position including at least a portion of at least one of said end faces and at least a portion of said outside surface of said filter body; and curing said adhesive sheath of said reinforcing material to adhesively bond said reinforcing material onto said filter body.

14. The method of claim 13 wherein the providing step, the adhesive sheath comprises a hardened thermoplastic adhesive;

wherein after the providing step, the method further comprises:

heating said adhesive sheath of said reinforcing material until said adhesive is above a flow point temperature; and wherein said curing step is practiced by cooling said adhesive below said flow point temperature.

* * * * *